United States Patent
Palanchoke et al.

(10) Patent No.: US 12,474,618 B2
(45) Date of Patent: Nov. 18, 2025

(54) MULTISPECTRAL FILTER MATRIX WITH CURVED Fabry-Perot FILTERS AND METHODS FOR MANUFACTURING THE SAME

(71) Applicant: COMMISSARIAT À L'ENERGIE ATOMIQUE ET AUX ENERGIES ALTERNATIVES, Paris (FR)

(72) Inventors: Ujwol Palanchoke, Grenoble (FR); Sébastien Berard-Bergery, Grenoble (FR); Stefan Landis, Grenoble (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 342 days.

(21) Appl. No.: 18/346,584

(22) Filed: Jul. 3, 2023

(65) Prior Publication Data
US 2024/0004257 A1    Jan. 4, 2024

(30) Foreign Application Priority Data
Jul. 4, 2022 (FR) ...................................... 2206767

(51) Int. Cl.
G02F 1/21 (2006.01)
(52) U.S. Cl.
CPC .......... *G02F 1/213* (2021.01); *G02F 2201/34* (2013.01); *G02F 2203/055* (2013.01)
(58) Field of Classification Search
CPC ................ G02F 1/213; G02F 2201/34; G02F 2203/055; G02B 5/201; G02B 5/288
See application file for complete search history.

(56) References Cited

U.S. PATENT DOCUMENTS

| | | | |
|---|---|---|---|
| 4,466,699 A | 8/1984 | Droessler et al. | |
| 6,031,653 A | 2/2000 | Wang | |
| 2011/0043823 A1 | 2/2011 | Hillmer et al. | |
| 2012/0182619 A1 | 7/2012 | Gelikonov et al. | |
| 2014/0217625 A1* | 8/2014 | Hazart ................... G02B 5/288 |
| | | | 264/1.7 |

OTHER PUBLICATIONS

Search Report as issued in French Patent Application No. 2206767, dated Mar. 10, 2023.
Shrestha, V. J., et al., "Non-iridescent Transmissive Structural Color Filter Featuring Highly Efficient Transmission and High Excitation Purity," Scientific Reports 4, 4921, (Year: 2014).

* cited by examiner

Primary Examiner — James C. Jones
(74) Attorney, Agent, or Firm — Pillsbury Winthrop Shaw Pittman LLP (57) ABSTRACT

A multispectral filter matrix for an electromagnetic wave, the matrix including at least a first and a second optoelectronic element, each optoelectronic element including a colour filter and a photoelectric transducer facing the filter, each colour filter forming a Fabry-Perot cavity including a first reflective layer, a second reflective layer and a Fabry-Perot cavity layer of dielectric material between the first reflective layer and the second reflective layer, the layer of dielectric material including a lower surface, in contact with the first reflective layer; the lower surface being curved, an upper surface in contact with the second reflective layer, the upper surface being curved, the average thicknesses of the two layers of dielectric material of the two filters being different.

11 Claims, 10 Drawing Sheets

MULTISPECTRAL FILTER MATRIX WITH CURVED Fabry-Perot FILTERS AND METHODS FOR MANUFACTURING THE SAME

CROSS-REFERENCE TO RELATED APPLICATIONS

This application claims priority to French Patent Application No. 2206767, filed Jul. 4, 2022, the entire content of which is incorporated herein by reference in its entirety.

FIELD

The technical field of the invention is that of spectral filtering, especially for imaging applications and for making colour filters, infrared filters or other filters of longer wavelengths depending on the appropriate metal and cavity material, for CMOS type image sensors, liquid crystal display devices or light-emitting diodes. The invention can also be implemented in light emitting devices.

The present invention relates to a multispectral filtering matrix and methods for manufacturing such a matrix.

BACKGROUND

A spectral filter or colour filter allows light to be filtered by wavelength, so as to provide information on the intensity of light in some wavelengths. Several colour filters can be combined to form, for example, red-green-blue (RGB) filters that provide information on the intensity of these three colours.

Metal/dielectric colour filters based on a Fabry-Perot cavity are especially known. These filters comprise one or more dielectric (or possibly semiconducting) cavities formed between two thin metal films having a metal mirror function so as to form a Fabry-Perot cavity. An example of such a filter is described in document U.S. Pat. No. 6,031,653. Generally, the metal/dielectric stacks are different depending on the position on the optoelectronic component (an image sensor for example). The transmission of the filter is set up by adjusting thickness of the cavity. Thus, in operation, part of the incident light corresponding to the wavelength of the filter is transmitted through the same as a coloured beam, while the rest of the incident light is reflected. In general, the thickness of the dielectric layer sets the central transmitted wavelength, while the thickness of the metal layers allows the spectral width of transmission to be set. In addition, the use of multiple Fabry-Perot cavities allows the spectral transmission profile of the filter to be modified. A filter of this type is made using conventional semiconductor manufacturing techniques. For example, to obtain a red-green-blue filter, it is appropriate to form at least one dielectric cavity with a thickness having three different values.

Figure 1:
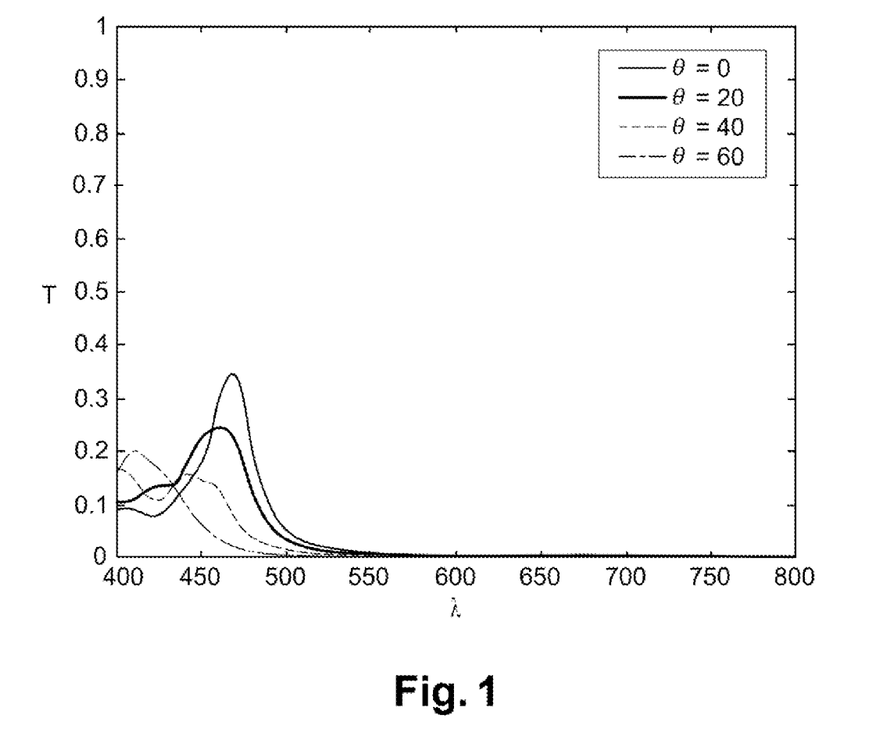
FIG. 1 is a representation of the spectral response of a Fabry-Perot cavity filter of the state of the art, as a function of the angle of incidence of an incident electromagnetic wave.

However, although wavelength selectivity can be achieved by changing the thickness of the cavity, a Fabry-Perot cavity filter is also very sensitive to the angle of incidence. [FIG. 1] shows the spectral response of a colour filter to an electromagnetic wave, for a fixed dielectric layer thickness and different angles of incidence of the electromagnetic wave.

Numerous studies have been carried out to overcome this lack of sensitivity of filters to the angle of incidence of electromagnetic waves. One way to reduce the sensitivity, described in the following paper: "Non-iridescent Transmissive Structural Color Filter Featuring Highly Efficient Transmission and High Excitation Purity. Sci Rep 4, 4921 (2014)", Shrestha, V., Lee, S S., Kim, E S. et al. is to use multiple cavities with a higher index cavity material. The authors of the paper used the fact that the angle-dependent fractional wavelength shift is determined by the refractive index of the cavity:

$$\frac{\frac{\partial \lambda_0}{\lambda_0}}{\partial \theta} \propto \frac{\cos\theta \sin\theta}{n^2 - (\sin\theta)^2},$$

where $\theta$ is the angle of incidence of the electromagnetic wave and $n$ is the refractive index of the cavity. The solutions provided reduce the angle sensitivity, but they require several lithography and etching steps for the manufacture thereof.

Another way to reduce the angle sensitivity is provided in document U.S. Pat. No. 4,466,699A which describes a Fabry-Perot filter with two plates of curved surfaces or, more particularly, aspheric surfaces that are movable relative to each other along an axis. The curved surfaces allow for an angle of incidence of the radiation that is not perpendicular to the surface at any point on the surface. The curvature of the plates is chosen so that the error introduced by the fact that the angle of incidence is not perpendicular is compensated for by the difference in distance between the plates, to obtain the desired wavelength output from the filter.

However, the Fabry-Perot filter provided in document U.S. Pat. No. 4,466,699A allows the distance between the plates to be varied to obtain one wavelength at a time and not multiple wavelengths at a time. Furthermore, since the filter has a variable distance between the plates, it cannot be used in imaging, and in particular at microelectronics dimensions with CMOS image sensors, due to manufacturing restrictions.

SUMMARY

An aspect of the invention offers a solution to the problems previously discussed, by providing a matrix comprising Fabry-Perot filters for obtaining several wavelengths, of low sensitivity to the variation of the angle of incidence of an electromagnetic radiation and usable in CMOS technology.

An aspect of the invention relates to a multispectral filtering matrix for an electromagnetic wave, the matrix including at least a first and a second optoelectronic element, each optoelectronic element comprising a colour filter and a photoelectric transducer facing said filter, each colour filter forming a Fabry-Perot cavity including a first reflective layer, a second reflective layer, and a Fabry-Perot cavity layer of dielectric material between the first reflective layer and the second reflective layer, the layer of dielectric material including:
  a lower surface, in contact with the first reflective layer, the lower surface being curved;
  an upper surface in contact with the second reflective layer, the upper surface being curved;
the thicknesses of the two layers of dielectric material of the two colour filters being different.

By virtue of an aspect of the invention, the transmission of the colour filters is independent of the angle of incidence of an incident electromagnetic wave, thereby obtaining a desired wavelength for each filter solely by varying thicknesses of the dielectric layers without regard to the angles of incidence. In addition, the matrix includes Fabry-Perot cavity filters used for imaging in microelectronics, and in particular in CMOS technologies.

Further to the characteristics just discussed in the preceding paragraph, the matrix according to a first aspect of the invention may have one or more complementary characteristics among the following, considered individually or according to any technically possible combinations:

for each colour filter:
the first reflective layer has a curved lower surface and a curved upper surface having the same radius of curvature, the upper surface of the first reflective layer being in contact with the lower surface of the layer of dielectric material;
The second reflective layer has a curved lower surface and a curved upper surface having the same radius of curvature, the lower surface of the second reflective layer being in contact with the upper surface of the layer of dielectric material.
the radii of curvature of the lower surface and the upper surface of the layer of dielectric material of each colour filter are strictly greater than 300 nm.
for each colour filter, the curvatures of the lower surface and the upper surface of the layer of dielectric material of each colour filter are both convex or both concave.
the curved profile of the lower surface of the layer of dielectric material of at least one of the first and second colour filters is defined by the following equation:

$$y = R_y * \left(1 - \left|\frac{x}{f*Sx}\right|^m\right)^{\frac{1}{n}} + h_{Cri1}$$

and the curved profile of the upper surface of said layer is defined by the following equation:

$$y = R_y * \left(1 - \left|\frac{x}{f*Sx}\right|^m\right)^{\frac{1}{n}} + hi + h_{Cri1}$$

in a (O, X, Y, Z) reference frame in space, with O being the origin of the lower surface of the first reflective layer;
where:
hi the thickness of the layer of dielectric material of said filter,
$h_{Cri1}$ the thickness, along the axis Y, of the first reflective layer of the filter,
Ry the radius of curvature of the lower surface and the upper surface of the layer of dielectric material along the axis Y for x=0,
m and n respectively a natural number and a non-zero natural number,
where f*Sx is the radius of curvature of the lower and upper surface of the layer of dielectric material along the axis X, where Sx is the size, along the axis X, of the photoelectric transducer facing the filter and f is a constant;
the curved profile of the lower surface of the layer of dielectric material of at least one of the first and second colour filters is defined by the following equation:

$$z = R_z * \left(1 - \left|\frac{x}{f*Sx}\right|^m - \left|\frac{y}{f*Sy}\right|^n\right)^{\frac{1}{k}} + h_{Cri1}$$

And the curved profile of the upper surface of said layer of dielectric material of the colour filter is defined by the following equation:

$$z = R_z * \left(1 - \left|\frac{x}{f*Sx}\right|^m - \left|\frac{y}{f*Sy}\right|^n\right)^{\frac{1}{k}} + h_i + h_{Cri1}$$

In a (O, X, Y, Z) reference frame in space, with O being the origin of the lower surface of the first reflective layer of the filter;
With:
hi the thickness of the layer of dielectric material of said filter,
$h_{Cri1}$ the thickness, along the axis Y, of the first reflective layer of the filter,
$R_z$ the radius of curvature of the lower surface and upper surface of the layer of dielectric material along the axis Z,
m and n respectively a natural number and a non-zero natural number,
with f*Sx the radius of curvature of the lower surface and upper surface of the layer of dielectric material in the axis X, where Sx is the size, along the axis X, of the photoelectric transducer facing the filter and f is a constant,
with f*Sy the radius of curvature of the lower surface and upper surface of the layer of dielectric material along the axis Y, Sy being the size along the axis Y of the photoelectric transducer facing the filter.
for each colour filter, when the curvatures of the lower surface and the upper surface of the layer of dielectric material are both convex, the curvature of the upper surface and the lower surface of the layer of dielectric material is chosen so as to focus the electromagnetic wave on the transducer facing said filter. This characteristic possibly makes it possible to dispense with a microlens, which is usually used in imaging to focus the electromagnetic waves received by a filter to the transducer.

A second aspect of the invention relates to a method for manufacturing a multispectral filtering matrix according to the invention wherein the thickness of the layer of dielectric material of the first colour filter is less than the thickness of the layer of dielectric material of the second colour filter, and making the first and second colour filters includes the following steps of:
depositing a resin layer onto a carrier substrate;
structuring the resin layer, to provide a first resin pattern defining a first pattern zone and a second resin pattern defining a second pattern zone, each resin pattern having a curved upper surface, the first and second pattern zones defining an overall pattern zone;
conformally depositing a first reflective layer onto the overall pattern zone, forming the first reflective layers of the first and second colour filters;
conformally depositing a first dielectric material layer onto the overall pattern zone, the first layer of dielectric material having a thickness equal to the thickness of the Fabry-Perot cavity layer of dielectric material of the first filter;
depositing a photosensitive resin layer onto the overall pattern zone;
removing, by photolithography, the part of the photosensitive resin layer covering the second pattern zone, conformally depositing a second layer of dielectric material onto the second pattern zone, the total thickness of the second layer of dielectric material and the first layer of dielectric material of the second pattern zone being equal to the thickness of the layer of dielectric material of the second colour filter;

removing the photosensitive resin layer, so as to release the first layer of dielectric material of the first pattern zone forming the Fabry-Perot cavity layer of dielectric material of the first colour filter at the surface;

conformally depositing a second reflective layer onto the overall pattern zone, forming the first reflective layer of the first and second colour filters.

A third aspect of the invention relates to a method for manufacturing a multispectral filtering matrix according to the invention, wherein the thickness of the layer of dielectric material of the first colour filter is greater than the thickness of the layer of dielectric material of the second filter, and making the first and second colour filters includes the following steps of:

depositing a resin layer onto a carrier substrate;

structuring the resin layer to provide a first resin pattern defining a first pattern zone and a second resin pattern defining a second pattern zone, each resin pattern having a curved upper surface, the first and second pattern zones defining an overall pattern zone;

conformally depositing a first reflective layer onto the overall pattern zone, forming the first reflective layers of the first and second colour filters;

conformally depositing a first layer of dielectric material onto the overall pattern zone, the first layer of dielectric material having a thickness equal to the thickness of the Fabry-Perot cavity layer of dielectric material of the first filter;

depositing a photosensitive resin layer onto the overall pattern zone;

removing the part of the photosensitive resin layer covering the second pattern zone by photolithography, removing a thickness of the layer of dielectric material of the second pattern zone to obtain the thickness of the layer of dielectric material of the second filter;

removing the photosensitive resin layer so as to release the first layer of dielectric material of the first pattern zone forming the Fabry-Perot cavity layer of dielectric material of the first colour filter at the surface;

conformally depositing a second reflective layer onto the overall pattern zone, forming the first reflective layers of the first and second colour filters.

By virtue of the second and third aspects of the invention, the lithography and etching steps are limited with respect to the state of the art, especially when several dielectric materials compose the Fabry-Perot cavity.

A fourth aspect of the invention relates to a method for manufacturing a multispectral filter matrix according to the invention, wherein the thickness of the layer of dielectric material of the first colour filter is less than the thickness of the layer of dielectric material of the second filter, and making the first and second colour filters includes the following steps of:

depositing a resin layer onto a carrier substrate;

structuring the resin layer to obtain a first resin pattern defining a first pattern zone and a second resin pattern defining a second pattern zone, each resin pattern having a curved upper surface, the first and second pattern zones defining an overall pattern zone;

conformally depositing a first reflective layer onto the overall pattern zone, forming the first reflective layers of the first and second colour filters;

depositing a layer of dielectric material onto the overall pattern zone, said layer of dielectric material having a substantially planar upper surface;

depositing a second resin layer onto the overall pattern zone;

structuring the second resin layer, to obtain first and second resin patterns of the second resin layer in the first and second pattern zones, respectively, each resin pattern of the second resin layer having a curved upper surface;

transferring the first and second resin patterns of the second resin layer into the layer of dielectric material to obtain the layer of dielectric material of the first filter in the first pattern zone and the layer of dielectric material of the second filter in the second pattern zone;

conformally depositing a second reflective layer onto the overall pattern zone, forming the first reflective layers of the first and second colour filters.

By virtue of the fourth aspect of the invention, the different thicknesses of the layer of dielectric materials of the filters are obtained in a single etching step.

Further to the characteristics just discussed in the preceding paragraph, the method according to a second, third and fourth aspect of the invention may have one or more additional characteristics among the following, considered individually or according to any technically possible combinations:

the resin structuration step is performed in three dimensions.

the resin structuration step is performed by grayscale lithography. Grayscale lithography makes it possible to obtain a not necessarily planar shape of the resin patterns and to form the resin into different curved shapes for example.

Aspects of the invention and their different applications will be better understood upon reading the following description and upon examining the accompanying figures.

BRIEF DESCRIPTION OF THE FIGURES

The figures are set forth by way of indicating and in no way limiting purposes of the invention.

DETAILED DESCRIPTION

The figures are set forth by way of indicating and in no way limiting purposes of the invention.

It is appropriate to remind beforehand that, in general and as is well known to those skilled in the art, a metal/dielectric type colour filter made from a Fabry-Perot cavity is obtained by dimensioning the thickness of the dielectric layer formed between the two metal layers. If filtering of several colours is sought on a same component, it is then necessary to be able to obtain a dielectric of variable thickness on this same component.

This dimensioning is, for example, made using an electromagnetic calculation program such as the Abeles matrix transfer formalism or a diffraction calculation for pixels whose size is close to the wavelength such as the Modal Fourier Expansion Method formalism or Rigorous Coupled Wave Analysis (RCWA).

These calculation programs make it possible to determine optimal parameters of the dielectric metal stacks for each pixel. The calculation takes account especially of the thicknesses of the metal and dielectric layers and their indices, the spectrum and the angular distribution of the incident light. For example, in the case of Fabry-Perot filters, the central wavelength of the filter is approximately determined by the following formula:

$$\lambda_{res} = \frac{2hn.\cos\theta}{m - \frac{\phi_1 + \phi_2}{2\pi}}$$

where
h is the thickness of the cavity, that is approximately the thickness of the dielectric layer
m, a positive integer between 1 and 10, is the order of the cavity,
n is the effective index of the cavity, and
$\Phi 1$ and $\Phi 2$ are the phase shifts in reflection on the metal mirrors (determined by the nature of the materials involved and the wavelength considered),
θ is the angle of incidence of the incident light on the filter (counted from the perpendicular to the filter surface).

Once the order of the cavity is chosen, the angle of attack is known, the index and phase shifts are known, all that remains is to determine an approximate thickness h so that the cavity is centred on a particular wavelength. Once the filter function has been calculated for each filter and each wavelength, the thicknesses h of the dielectrics are then adjusted according to the desired performance (search for a good signal to noise ratio, maximum transmission, etc.).

Another, more empirical method consists in calculating, for several thicknesses h, the response of the stack and choosing h such that the filter resonance peak (λres) is positioned in accordance with the specifications.

A first aspect of the invention relates to a multispectral filtering matrix, for at least one electromagnetic wave.

The electromagnetic wave received by the matrix may comprise wavelengths in the visible, (near, mid or far) infrared or microwave range.

In the following, the terms "Multispectral filtering matrix" and "Matrix" will be used interchangeably.

The matrix comprises at least two optoelectronic elements.

Figure 2:
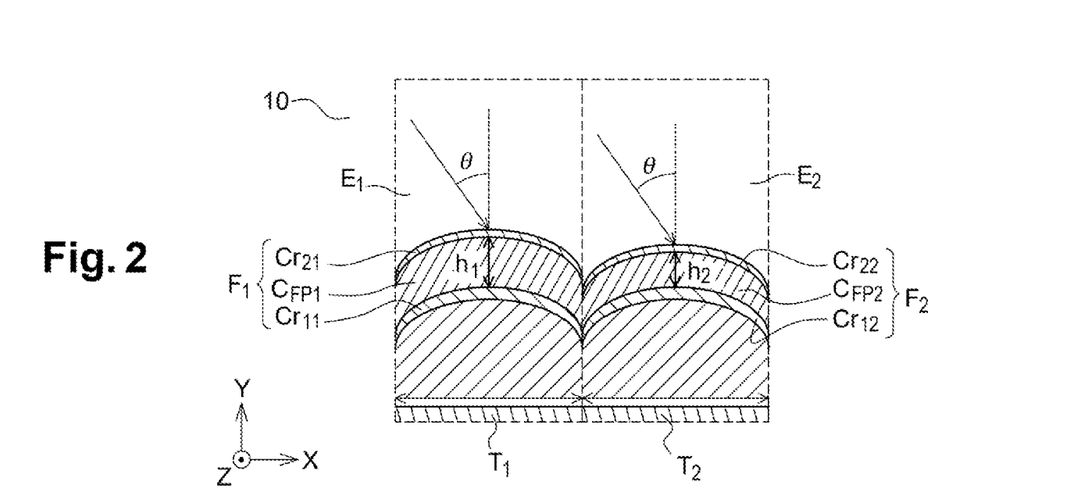
FIG. 2 is a diagram of a matrix, according to the invention, of two optoelectronic elements comprising two different colour filters respectively.

FIG. 2 is an example of a matrix 10 of two optoelectronic elements ($E_1$, $E_2$) each comprising a colour filter Fi and a transducer Ti facing said colour filter Fi.

The terms "colour filter" and "filter" will be used interchangeably in the following.

By colour filter Fi, it is meant a filter that only transmits said colour when it receives an electromagnetic wave.

Each filter Fi comprises a first reflective layer $C_{r1i}$, a second reflective layer $C_{r2i}$ and a layer of dielectric material $C_{FPi}$ between the two reflective layers ($C_{r1i}$, $C_{r2i}$).

The terms "Fabry-Perot cavity layer of dielectric material", "layer of dielectric material" and "dielectric layer" will be used interchangeably in the following.

According to an embodiment of the invention, the thicknesses ($h_1$, $h_2$) of the two layers of dielectric material $C_{FPi}$ of the two filters ($F_1$, $F_2$) are different. Thus, when each filter Fi receives an incident electromagnetic wave, it transmits a wavelength $\lambda_{res\_i}$ depending on the thickness hi of its layer of dielectric $C_{FPi}$ according to the previously mentioned formula:

$$\lambda_{res\_i} = \frac{2h_i.n.\cos\theta}{m - \frac{\phi_1 + \phi_2}{2\pi}}$$

In the example of [FIG. 2], the thickness hi of the dielectric layer $C_{FP1}$ of the first filter Fi is larger than the thickness $h_2$ of the dielectric layer $C_{FP2}$ of the second filter $F_2$.

Figure 3A:
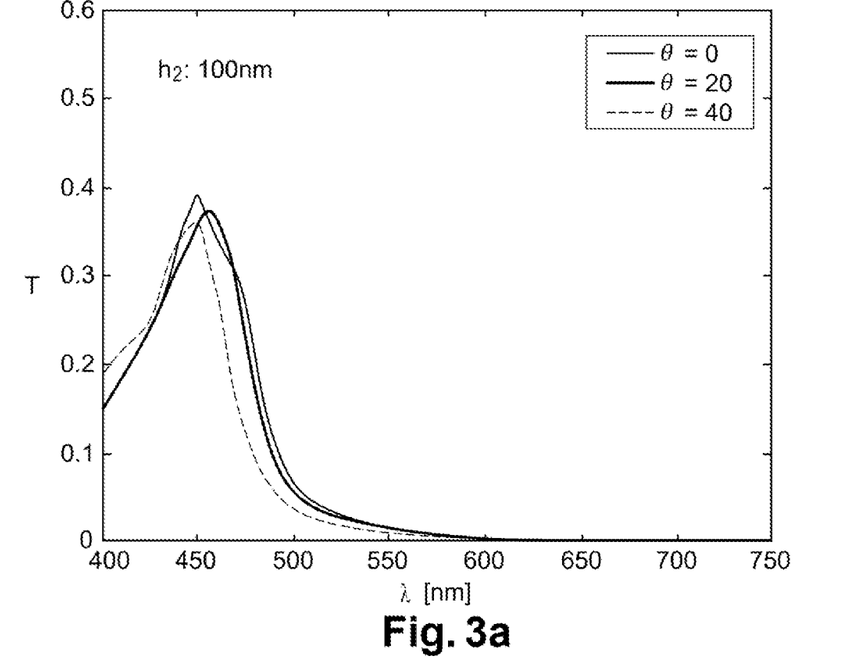
FIG. 3a shows the spectral response of a first colour filter, for different angles of incidence of an electromagnetic wave incident on the first filter of FIG. 2.

FIG. 3a represents the spectral responses of the first filter $F_1$ for a dielectric layer thickness h1 at $C_{FP1}$ equal to 100 nm and for several angles of incidence θ of an incident electromagnetic wave. Thus, it is noticed that for an angle of incidence θ equal to 0°, 20° and 40°, the spectral responses of the first filter Fi are substantially identical and therefore do not depend on the angle of incidence of the wave.

Figure 3B:
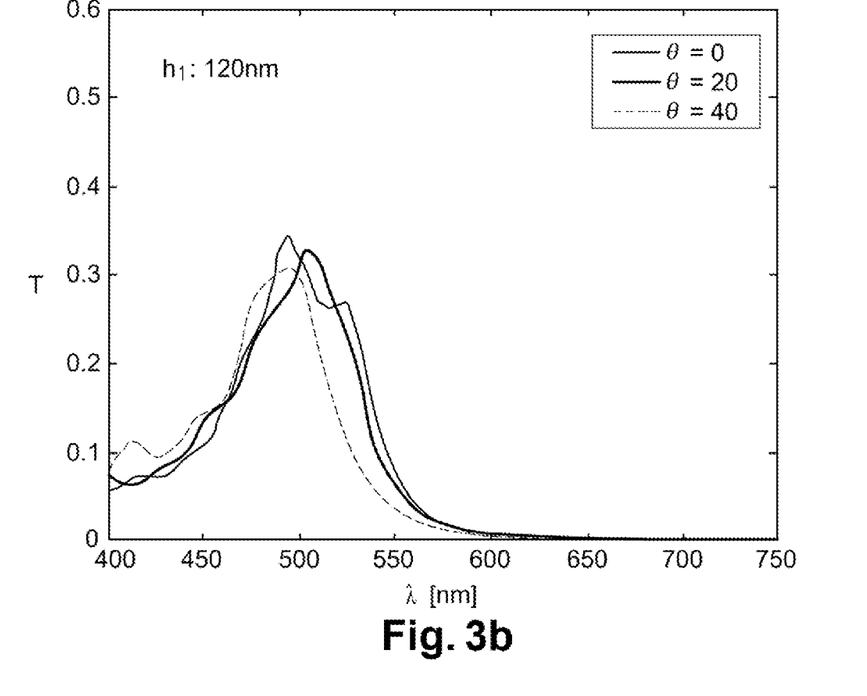
FIG. 3b shows the spectral response of a second colour filter, different from the first filter, for different angles of incidence of an electromagnetic wave incident on the second filter of FIG. 2.

FIG. 3b represents the spectral responses of the second filter $F_2$ for a thickness $h_2$ of the dielectric layer at $C_{FP1}$ equal to 120 nm and for several angles of incidence θ of an incident electromagnetic wave. Thus, it is noticed that for an angle of incidence θ equal to 0°, 20° and 40°, the spectral responses of the second filter $F_2$ are also substantially identical and therefore do not depend on the angle of incidence of the wave.

It is noticed in [FIG. 3a] and [FIG. 3b] that the two wavelengths transmitted by the first filter Fi and the second filter $F_2$, respectively, are quite different, given the two different thicknesses (hi, $h_2$) of the two dielectric layers ($C_{FP1}$, $C_{FP1}$) of the two filters.

When the matrix 10 comprises at least three optoelectronic elements $E_i$, at least two optoelectronic elements $E_i$ comprise two different filters Fi respectively. The third optoelectronic element $E_3$ may comprise a filter $F_3$ identical to one of the other two filters Fi of the other two optoelectronic elements $E_i$ or a filter $F_3$ different from the two optoelectronic elements.

By "two different filters", it is meant two filters with two different respective thicknesses of dielectric layer.

By "two identical filters", it is meant two filters with two identical respective thicknesses of dielectric layer.

For example, an RGB type matrix 10 may comprise 50% green colour filters, 25% red colour filters and 25% blue colour filters.

According to an embodiment not represented, the matrix 10 comprises a number C×L of optoelectronic elements $E_i$, where C represents the number of columns of the matrix 10 and L represents the number of rows of the matrix 10.

L and C are two natural numbers strictly greater than 0. At least one of the natural numbers L or C is greater than or equal to 2.

Figure 4:
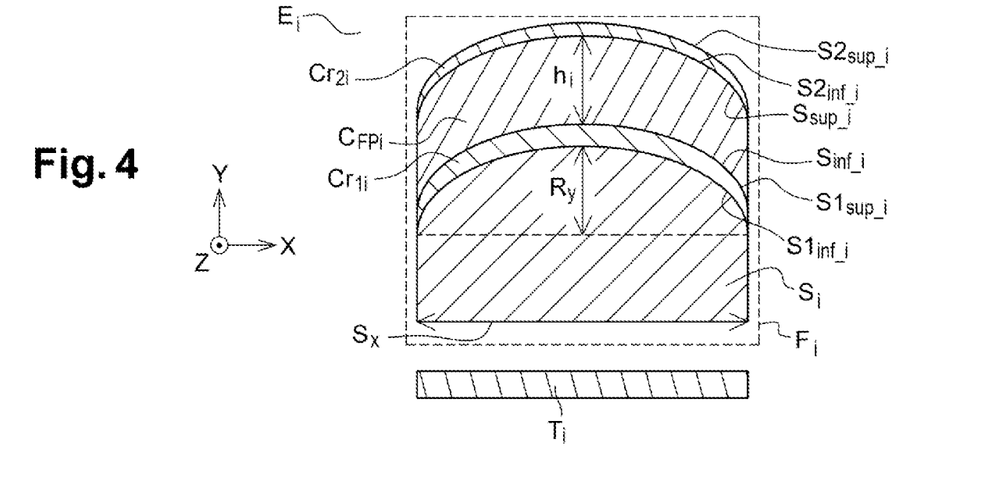
FIG. 4 is a detailed diagram of an optoelectronic element of the matrix according to the first aspect of the invention.

The structure of each optoelectronic element $E_i$ is represented in detail in [FIG. 4].

Each optoelectronic element $E_i$ is a pixel.

Each optoelectronic element $E_i$ may comprise, in addition to the filter Fi and the transducer Ti, a carrier substrate Si on which the different layers are made.

Each reflective layer ($C_{r1i}$, $C_{r2i}$) of each filter Fi is, in an embodiment, made of metal and has a metal mirror function. The metal is, for example, silver.

The upper $S1_{sup\_i}$ and lower $S1_{inf\_i}$ surfaces of the first reflective layer $C_{r1i}$ of each filter Fi are curved.

The upper $S2_{sup\_i}$ and lower $S2_{inf\_i}$ surfaces of the second reflective layer $C_{r2i}$ of each filter Fi are also curved.

For each filter Fi, each layer of dielectric material $C_{FPi}$ includes a lower surface $S_{inf\_i}$ in contact with the first reflective layer $C_{r1i}$ and an upper surface $S_{sup\_i}$ in contact with the second reflective layer $C_{r2i}$.

Here, the lower surface $S_{inf\_i}$ of the dielectric layer $C_{FPi}$ is in contact with the upper surface $S1_{sup\_i}$ of the first reflective layer $C_{r1i}$. The radius of curvature of the upper surface $S1_{sup\_i}$ of the first reflective layer $C_{r1i}$ is equal to the radius of curvature of the lower surface $S_{inf\_i}$ of the layer of dielectric material $C_{FPi}$.

Similarly, the upper surface $S_{sup\_i}$ of the dielectric layer $C_{FPi}$ is in contact with the lower surface $S2_{inf\_i}$ of the second reflective layer $C_{r2i}$. The radius of curvature of the upper surface $S2_{inf\_i}$ of the second reflective layer $C_{r2i}$ is equal to the radius of curvature of the upper surface of the layer of dielectric material $C_{FPi}$.

For each colour filter Fi, the curvatures of the lower surface $S_{inf\_i}$ and the upper surface $S_{sup\_i}$ of the layer of dielectric material $C_{FPi}$ are both convex. In this embodiment, the curvatures of the lower surface $S1_{inf\_i}$ and the upper surface $S1_{sup\_i}$ of the first reflective layer $C_{r1i}$ and the curvatures of the lower surface $S2_{inf\_i}$ and the upper surface $S2_{sup\_i}$ of the second reflective layer $C_{r2i}$ are all four convex.

When the upper surface $S2_{sup\_i}$ and the lower surface $S2_{inf\_i}$ of the second reflective layer $C_{r2i}$ of a filter $F_i$ are convex, the filter $F_i$ allows the electromagnetic wave to be focused on the transducer $T_i$ facing said filter $F_i$, unlike a conventional filter of the state of the art which requires a microlens above the Fabry-Perot cavities in order to focus an incident wave.

In an embodiment, the radius of curvature of the lower surface $S_{inf\_i}$ and the upper surface $S_{sup\_i}$ of the layer of dielectric material $C_{FPi}$ of each colour filter $F_i$ is strictly greater than 300 nm.

The dielectric material of the layer of dielectric material $C_{FPi}$ of each colour filter $F_i$ is, in an embodiment, but not exclusively, a transparent material in the visible range, such as an organic material of the photosensitive polymer type, modelled and then hardened, or an inorganic material (oxide, silicon nitride, alumina, etc.). It should be noted that aspects of the invention are not limited to the visible range and that other materials transparent at other wavelengths, especially in the infrared (for example using silicon), can be used.

Each $F_i$ filter behaves as a material with a constant refractive index of 1.46, which is close to the refractive index of $SiO_2$ of 1.47 in the visible spectrum.

The thickness hi of the layer of dielectric material $C_{FPi}$ of each colour filter $F_i$ is in an embodiment constant along the whole length of said $C_{FPi}$ layer. In other words, the radius of curvature of the upper surface $S_{sup\_i}$ and the radius of curvature of the lower surface $S_{inf\_i}$ of the layer of dielectric material $C_{FPi}$ are identical.

In the case of FIGS. 3a and 3b, the thickness hi of a layer of dielectric material $C_{FPi}$ of each filter $F_i$ is equal to 100 nm and 120 nm respectively.

According to another embodiment, each colour filter $F_i$ has a thickness $h_{diel\_i}$ (x, y) depending on the position x on the axis X and the position y on the axis Y.

According to one embodiment, the curved profile of the lower surface $S_{inf\_i}$ of the dielectric layer $C_{FPi}$ of at least one filter $F_i$ is defined by the following equation in a (O, X, Y) reference frame of a (O, X, Y, Z) reference frame in space, with O being the origin of the lower surface of the first reflective layer $S1_{inf\_i}$:

$$y = R_y * \left(1 - \left|\frac{x}{f*Sx}\right|^m\right)^{\frac{1}{n}} + h_{Cri1}$$

And the curved profile of the upper surface $S_{sup\_i}$ of the layer of dielectric material $C_{FP}$ is defined by the following equation:

$$y = R_y * \left(1 - \left|\frac{x}{f*Sx}\right|^m\right)^{\frac{1}{n}} + hi + h_{Cri1}$$

$h_{Cri1}$ is the thickness of the first reflective layer $Cr_{1i}$ of said filter $F_i$.

$h_i$ is the thickness of the layer of dielectric material $C_{FPi}$ of said filter F, and in an embodiment along the axis Y.

$R_y$ is the radius of curvature of the lower surface along the axis Y for x=0.

m and n are respectively a natural number and a non-zero natural number.

For example, m=1.8 and n=0.8.

The term f*Sx is the radius of curvature of the lower surface $S_{inf\_i}$ and the upper surface $S_{sup\_i}$ of the layer of dielectric material $C_{FPi}$ along the axis X.

$S_x$ is the size, along the axis X, of the optoelectronic element E.

$S_x$ is a positive real number, for example equal to 2000 nm or 5000 nm.

f is a constant which defines the radius of curvature of the lower surface $S_{inf\_i}$ and the upper surface $S_{sup\_i}$ of the layer of dielectric material $C_{FPi}$ along the axis X.

In an embodiment, the constant f is between 0.4 and 1. For example, f is 0.5.

According to another embodiment of a three-dimensional filter, the curved profile of the lower surface $S_{inf\_i}$ of the dielectric layer $C_{FPi}$ of at least one filter $F_i$ is defined by the following equation:

$$z = R_z * \left(1 - \left|\frac{x}{f*Sx}\right|^m - \left|\frac{y}{f*Sy}\right|^n\right)^{\frac{1}{k}} + h_{Cri1}$$

The curved profile of the upper surface $S_{sup\_i}$ of the dielectric layer $C_{FPi}$ is defined by the following equation:

$$z = R_z * \left(1 - \left|\frac{x}{f*Sx}\right|^m - \left|\frac{y}{f*Sy}\right|^n\right)^{\frac{1}{k}} + h_i + h_{Cri1}$$

RZ is the radius of curvature of the lower surface along the axis Z.

$S_y$ is the size, along the axis Y, of the element. SZ is a positive real number.

f is a constant which defines the radius of curvature of the lower surface $S_{inf\_i}$ and the upper surface $S_{sup\_i}$ along the axis X and along the axis Y.

In an embodiment, f is between 0.4 and 1. For example, f is 0.5.

The term f*Sx is the radius of curvature of the lower surface $S_{inf\_i}$ and the upper surface $S_{sup\_i}$ of the layer of dielectric material CPR along the axis X.

The term f*$S_y$ is the radius of curvature of the lower surface $S_{inf\_i}$ and the upper surface $S_{sup\_i}$ of the layer of dielectric material CPR along the axis Y.

k is a non-zero natural number. The photoelectric transducers $T_i$ can operate either as a collector of light from the filters or as a light emitter to the filters. If they are collectors, the transducers can be, for example, CMOS-type photodiodes. If they are emitters, the transducers may be, for example, LEDs, QLEDs or LASER diodes, in which case the emitters have a broader emission spectrum than the corresponding Fabry-Perot cavities.

A second aspect of the invention relates to a method 200a for manufacturing a multispectral filtering matrix 10, wherein the thickness hi of the layer of dielectric material $C_{FP1}$ of the first colour filter $F_i$ is smaller than the thickness $h_2$ of the layer of dielectric material $C_{FP2}$ of the second filter $F_2$.

Figure 5:
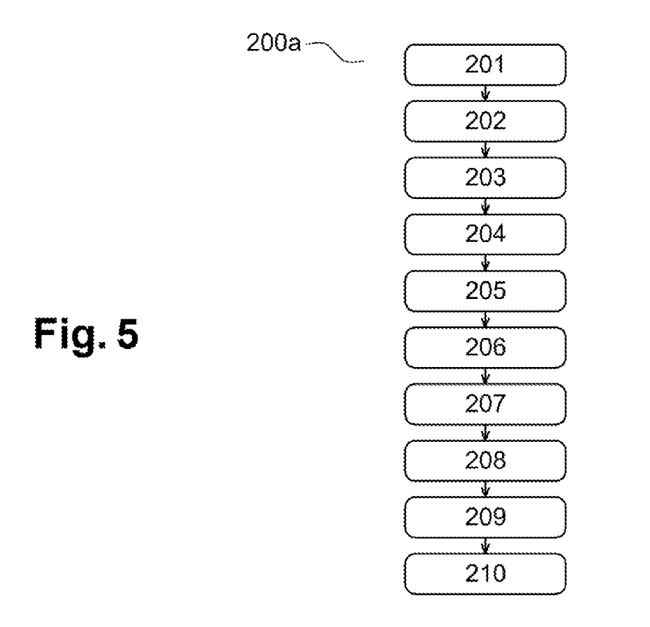
FIG. 5 is a block diagram of a method for manufacturing the matrix and in particular the colour filters according to a second aspect of the invention.

FIG. 5 is a block diagram of the method 200a for manufacturing the multispectral filtering matrix 10 according to the second aspect of the invention and in particular of the steps for making the first $F_i$ and second $F_2$ colour filters.

Figure 6:
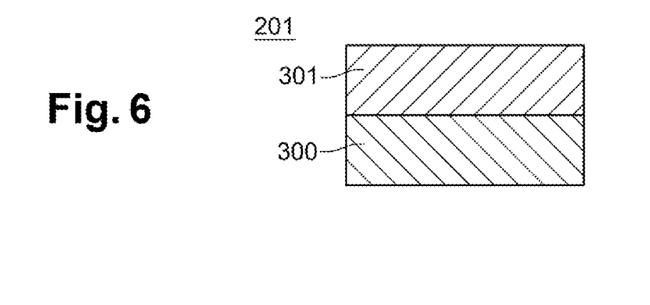
FIG. 6, FIG. 7, FIG. 8, FIG. 9, FIG. 10, FIG. 11, FIG. 12, FIG. 13, FIG. 14, FIG. 15 illustrate the steps of the method of FIG. 5 according to the second aspect of the invention.

The first step 201 of the method 200a according to the second aspect of the invention, illustrated in [FIG. 6], consists in depositing a resin layer 301 onto a carrier substrate 300. The carrier substrate 300 may, for example, be a Si substrate, a Silicon On Insulator (SOI) substrate or a glass or sapphire substrate.

Figure 7:
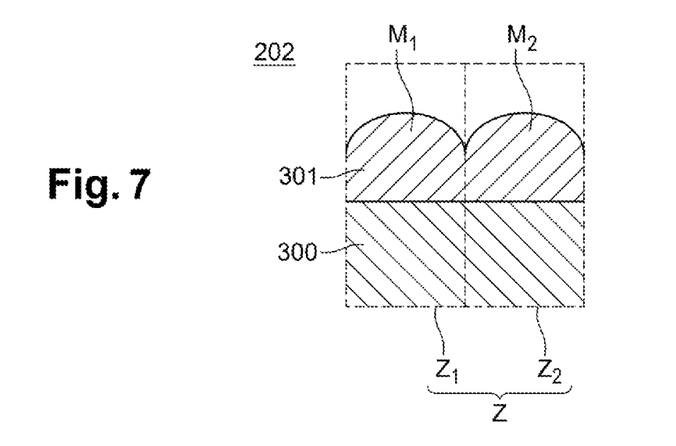

The second step 202 of the method 200a, illustrated in [FIG. 7], consists in structuring the resin layer 301 to obtain at least a first resin pattern $M_1$ defining a first pattern zone $Z_1$ and a second resin pattern $M_2$ defining a second pattern zone $Z_2$.

Each resin pattern MI has a curved upper surface.

The first $Z_1$ and second $Z_2$ pattern zones define an overall pattern zone Z.

Structuring is carried out for example in two dimensions or, in an embodiment, in three dimensions.

Resin structuring may be performed by a lithography method. This lithography can be electronic or optical grayscale lithography (followed by stabilisation of the grayscale resin by thermal or ultraviolet methods). Other lithography techniques such as two-photon lithography or nanoimprinting lithography can also be used for making the resin structure. The dimensions and curvature of the upper surface of each resin pattern can be freely set in the three spatial directions (O, X, Y, Z).

Figure 8:
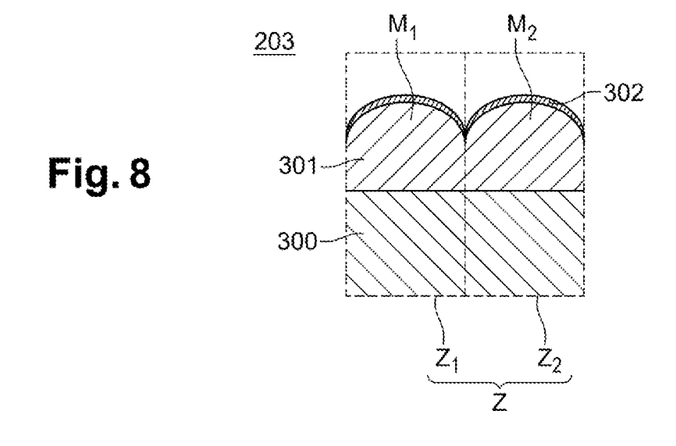

The third step 203 of the method 200a according to the second aspect of the invention, illustrated in [FIG. 8], consists in conformally depositing a first reflective layer 302 onto the overall pattern zone Z. The first reflective layer 302 completely covers the first $M_1$ and second $M_2$ resin patterns and forms the first reflective layer $C_{r1i}$ of each colour filter $F_i$.

Each reflective layer is in an embodiment continuously deposited onto the first $M_1$ and second $M_2$ resin patterns by Plasma-Enhanced Chemical Vapor Deposition (PECVD), Physical Vapor Deposition (PVD), Pulsed Laser Deposition (PLD), or Atomic Layers Deposition (ALD) for example.

Figure 9:
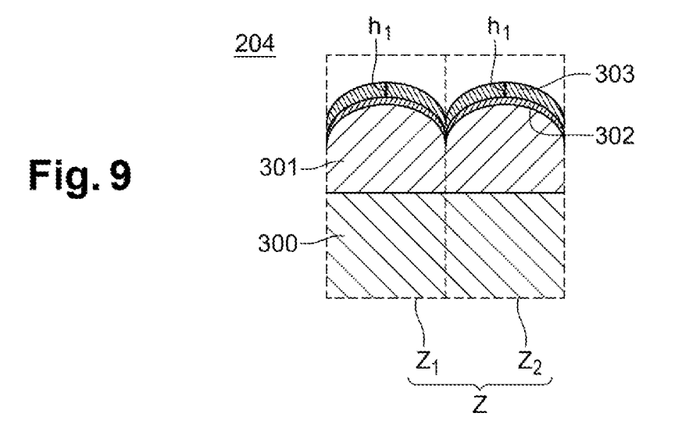

The fourth step 204 of the method 200a according to the second aspect of the invention, illustrated in [FIG. 9], consists in conformally depositing a first layer 303 of dielectric material onto the overall pattern zone Z.

The first layer 303 of dielectric material is in an embodiment continuously deposited according to the previously mentioned conformal deposition methods and indirectly completely covers the first $M_1$ and second $M_2$ resin patterns.

The first layer of dielectric material 303 has a thickness equal to the thickness h1 of the Fabry-Perot cavity layer of dielectric material $C_{FP1}$ of the first filter $F_1$.

Figure 10:
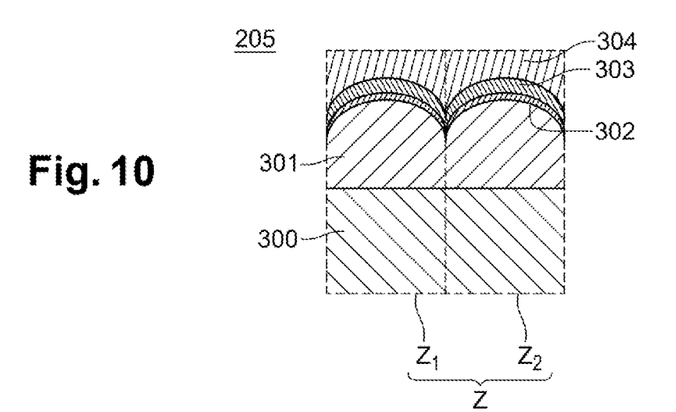

The fifth step 205 of the method 200a according to the second aspect of the invention, illustrated in [FIG. 10], consists in depositing a resin layer such as a photosensitive resin 304 onto the overall pattern zone Z. The photosensitive resin is, in an embodiment, a photosensitive polymer.

Figure 11:
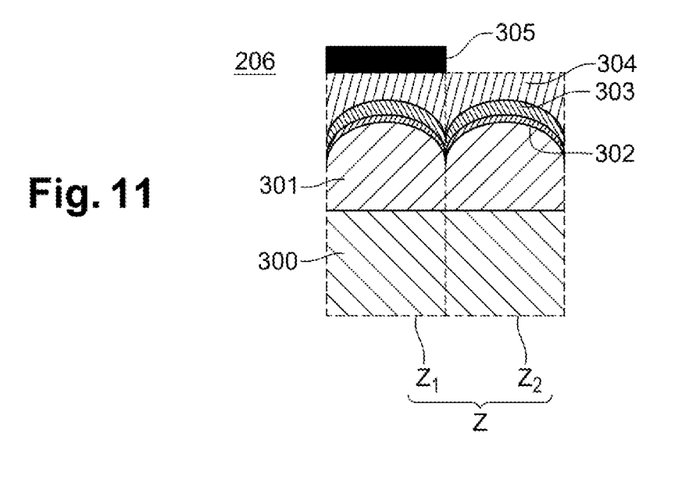

The method 200a according to the second aspect of the invention may include a sixth step 206, illustrated in [FIG. 11], of using a mask 305 to expose the part of the photosensitive resin layer 304 covering the second pattern zone $Z_2$ so that the exposed part of the resin layer may then be selectively etched.

Figure 12:
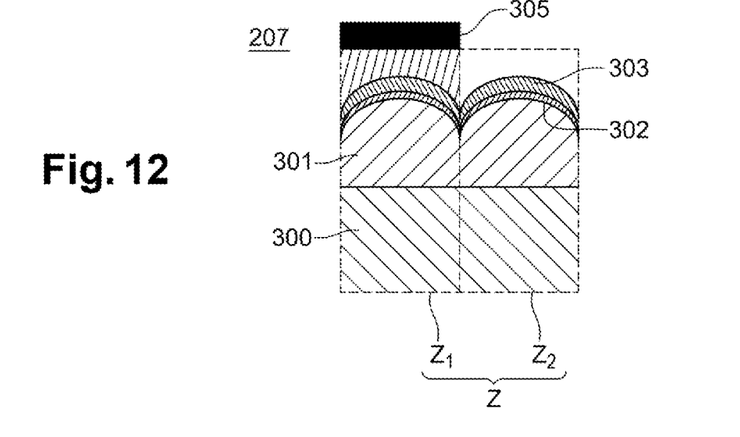

The seventh step 207 of the method 200a according to the second aspect of the invention, illustrated in [FIG. 12], consists in removing the part of the photosensitive resin layer 304 covering the second pattern zone $Z_2$.

Figure 13:
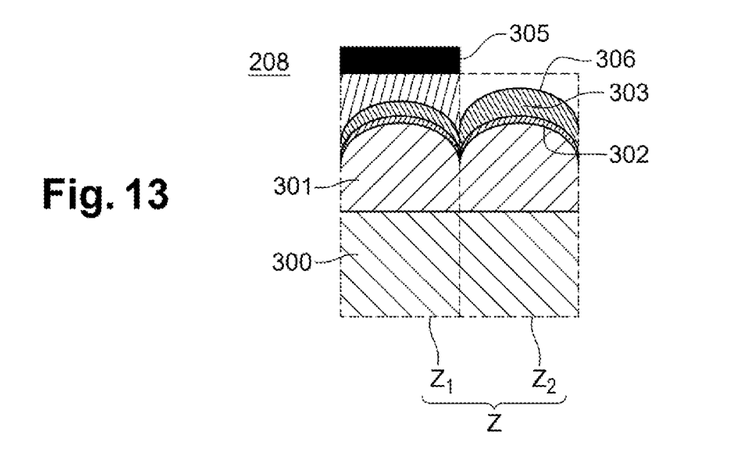

The eighth step 208 of the method 200a according to the second aspect of the invention, illustrated in [FIG. 13], consists in depositing a second layer 306 of dielectric material onto the second pattern zone $Z_2$, to form together with the part of the first layer 303 of the second pattern zone $Z_2$, the Fabry-Perot cavity layer of dielectric material $C_{FP2}$ of the second colour filter $F_2$.

Thus, the total thickness of the second layer 306 of dielectric material and the first layer 303 of dielectric material of the second pattern zone $Z_2$ is equal to the thickness $h_2$ of the layer of dielectric material $C_{FP2}$ of the second filter $F_2$.

Figure 14:
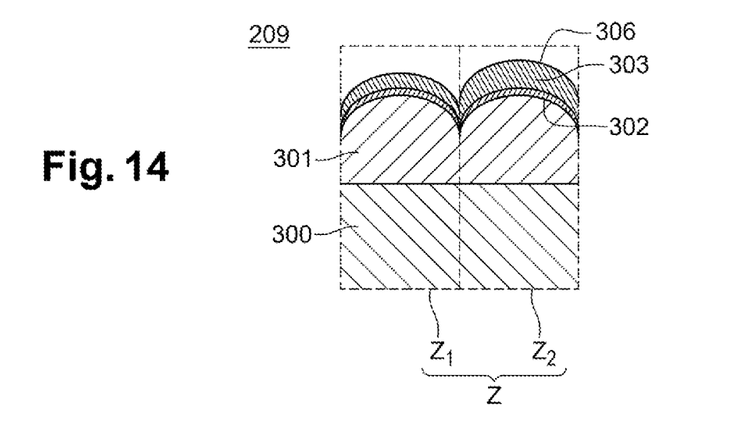

The ninth step 209 of the method 200a according to the second aspect of the invention, illustrated in [FIG. 14], consists in removing the layer of photosensitive resin not removed in the seventh step 207, so as to release the Fabry-Perot cavity layer of dielectric material $C_{FP1}$ of the first filter $F_1$ at the surface.

Figure 15:
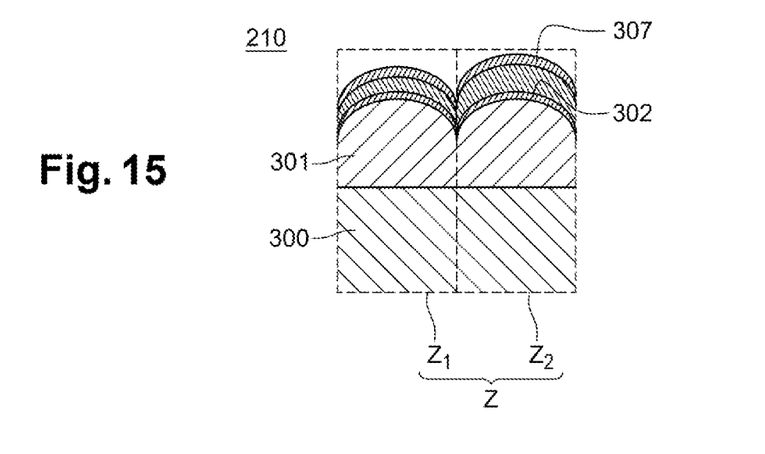

The tenth step 210 of the method 200a according to the second aspect of the invention, illustrated in [FIG. 15], consists in depositing a second reflective layer 307 onto the overall pattern zone Z to form the second reflective layer $C_{FP2}$ of the first $F_1$ and second $F_2$ colour filters respectively.

A third aspect of the invention relates to a method 200b for manufacturing a multispectral filtering matrix 10 in which the thickness hi of the layer of dielectric material $C_{FP1}$ of the first colour filter $F_1$ is greater than the thickness $h_2$ of the layer of dielectric material $C_{FP2}$ of the second filter $F_2$.

Figure 16:
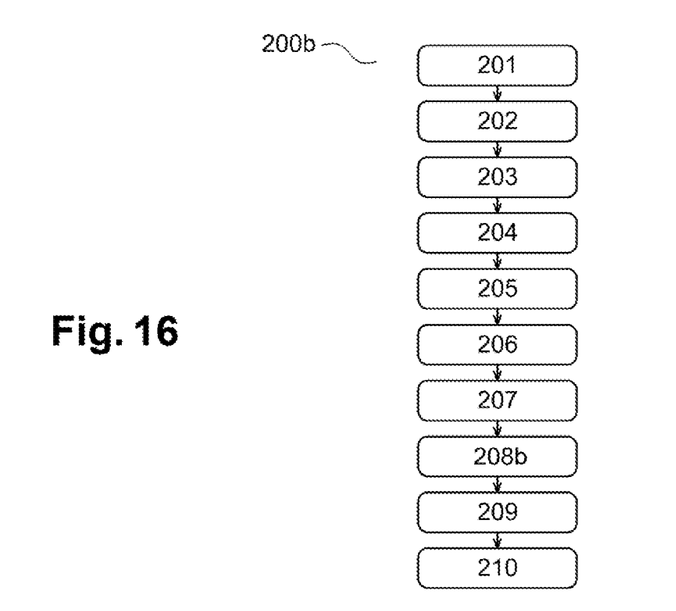
FIG. 16 is a block diagram of a method for manufacturing the matrix and in particular the colour filters according to a third aspect of the invention.

FIG. 16 is a block diagram of the method 200b for manufacturing the multispectral filtering matrix 10 according to the third aspect of the invention and in particular the steps of making the first $F_i$ and the second $F_2$ colour filters.

The method 200b according to the third aspect of the invention comprises first 201, second 202, third 203, fourth 204, fifth 205, sixth 206 and seventh 207 steps identical to the steps of the method 200a according to the second aspect of the invention.

Figure 17:
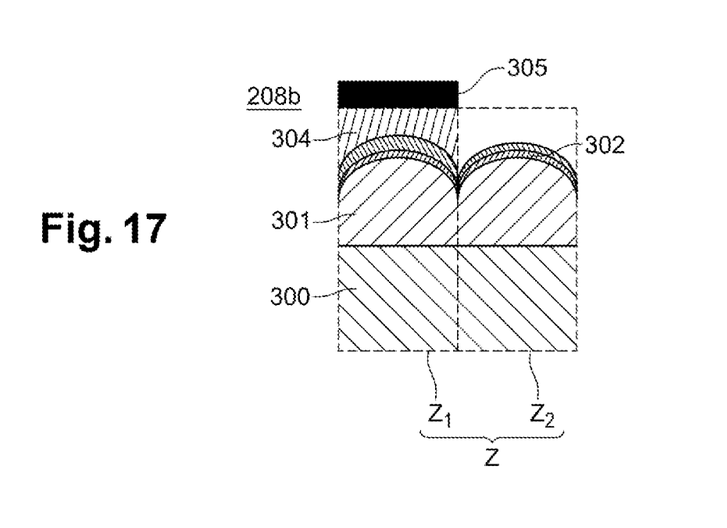
FIG. 17 illustrates a step of the method according to the third aspect of the invention.

The eighth step 208b of the method according to the third aspect of the invention, illustrated in [FIG. 17], consists in removing a thickness of the first layer 303 of dielectric material of the second zone $Z_2$ to obtain the thickness $h_2$ of the Fabry-Perot cavity layer of dielectric material $C_{FP2}$ of the second filter $F_2$.

The method 200b according to the third aspect of the invention then comprises the ninth 209 and tenth 210 steps identical to those of the method 200a according to the second aspect of the invention.

A fourth aspect of the invention relates to a method 200c for manufacturing the multispectral filtering matrix 10, wherein the thickness hi of the layer of dielectric material $C_{FP1}$ of the first colour filter $F_i$ is less than the thickness $h_2$ of the layer of dielectric material $C_{FP2}$ of the second filter $F_2$.

Figure 18:
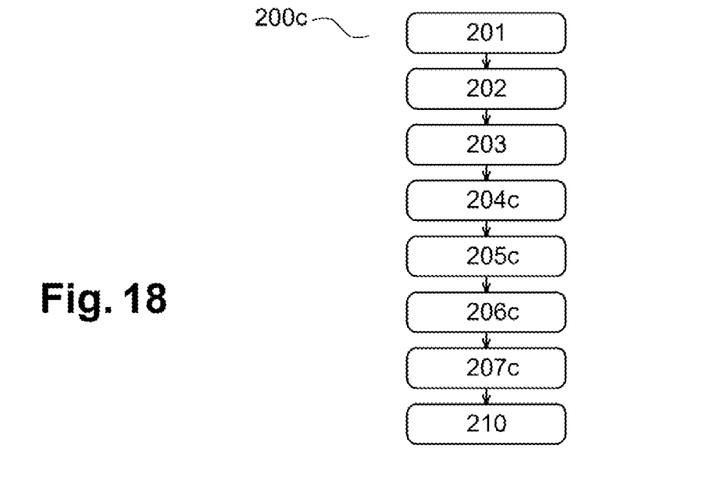
FIG. 18 is a block diagram of a method for manufacturing the matrix and in particular the colour filters according to a fourth aspect of the invention.

FIG. 18 is a block diagram of a method for manufacturing the multispectral filtering matrix 10 according to a fourth aspect of the invention and in particular the steps for making the first $F_i$ and second $F_2$ colour filters.

The method 200c according to the fourth aspect of the invention comprises the first 201, second 202 and third 203 steps identical to those illustrated for the method 200a according to the second aspect of the invention.

Figure 19:
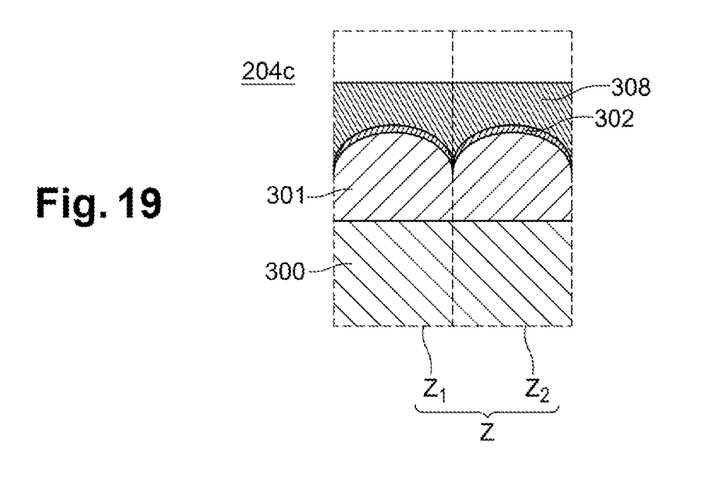
FIG. 19, FIG. 20, FIG. 21, FIG. 22 illustrate steps of the method of FIG. 18 according to the fourth aspect of the invention.

The fourth step 204c of the method according to the fourth aspect of the invention, illustrated in [FIG. 19], consists in depositing a layer 308 of dielectric material onto the overall pattern zone, said layer 308 having a planar upper surface.

Figure 20:
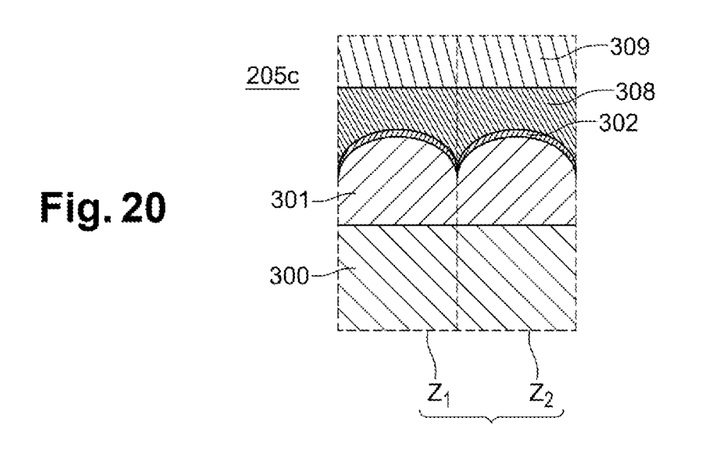

The fifth step 205c of the method 200c according to the fourth aspect of the invention, illustrated in [FIG. 20], consists in depositing a second layer 309 of resin onto the overall pattern zone Z.

Figure 21:
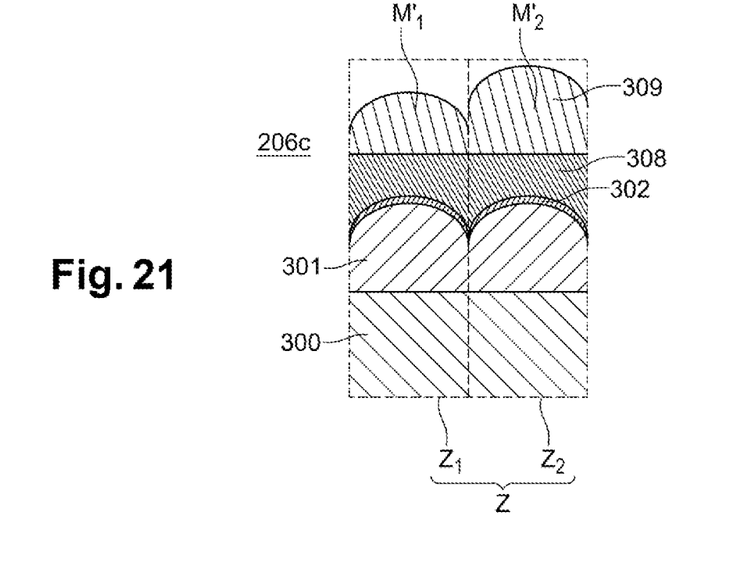

The sixth step 206c of the method 200c according to the fourth aspect of the invention, illustrated in [FIG. 21], consists in structuring, for example in three dimensions, the second resin layer 309, to obtain a first $M'_1$ pattern in the first pattern zone $Z_1$ and a second $M'_2$ pattern in the second pattern zone $Z_2$. Resin structuring is performed according to the same methods as mentioned in the second step of the method 200a according to the second aspect of the invention.

Each resin pattern $M'_1$ of the second resin layer 309 has a curved upper surface.

The average heights of the two resin patterns $M'_1$, $M'_2$ of the second resin layer 309, relative to the planar surface of the layer of dielectric material 308, are different.

The height of the first pattern $M'_1$ of the second resin layer 309 is smaller than the height of the second pattern $M'_2$ of the second resin layer 309.

Figure 22:
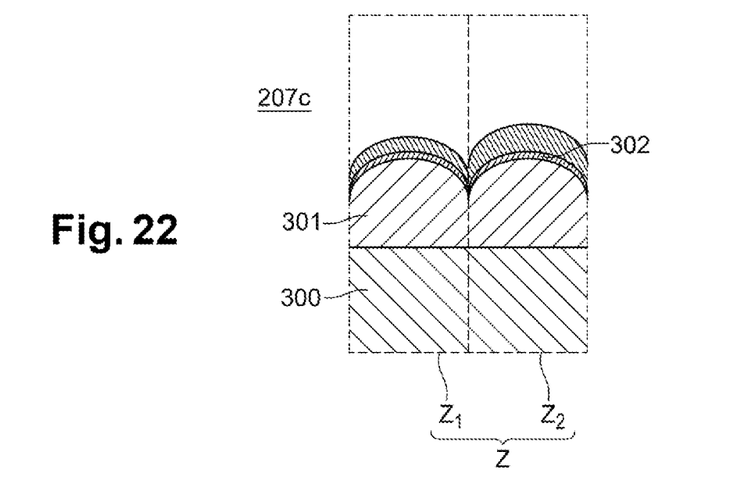

The seventh step 207c of the method 200c according to the fourth aspect of the invention, illustrated in [FIG. 22], consists in transferring the first $M'_1$ and second $M'_2$ resin patterns of the second resin layer 309 into the layer of dielectric material 308, to obtain the layer of dielectric material $C_{FP1}$ of the first filter $F_i$ in the first pattern zone and the layer of dielectric material $C_{FP2}$ of the second filter $F_2$ in the second pattern zone $Z_2$.

Pattern transferring is, in an embodiment, performed by etching, non-selectively and at constant speed.

The method 200c according to the fourth aspect of the invention further comprises the tenth 210 step of the method 200a according to the second aspect of the invention.

It will be appreciated that the various embodiments and aspects of the inventions described previously are combinable according to any technically permissible combinations.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The invention claimed is:

1. A multispectral filtering matrix for an electromagnetic wave, the matrix including at least a first and a second optoelectronic element, each optoelectronic element comprising a colour filter and a photoelectric transducer facing said colour filter, each colour filter forming a Fabry-Perot cavity including a first reflective layer, a second reflective layer and a Fabry-Perot cavity layer of dielectric material between the first reflective layer and the second reflective layer, the layer of dielectric material including:
   a lower surface, in contact with the first reflective layer, the lower surface being curved;
   an upper surface in contact with the second reflective layer, the upper surface being curved;
wherein thicknesses of the two layers of dielectric material of the two colour filters associated with the first and second optoelectronic elements being different.

2. The multispectral filtering matrix according to claim 1, wherein, for each colour filter:
   the first reflective layer has a curved lower surface, and a curved upper surface, having a same radius of curvature, the upper surface of the first reflective layer being in contact with the lower surface of the layer of dielectric material;
   the second reflective layer has a curved lower surface and a curved upper surface with a same radius of curvature, the lower surface of the second reflective layer being in contact with the upper surface of the layer of dielectric material.

3. The multispectral filtering matrix according to claim 1, wherein the radii of curvature of the lower surface and of the upper surface of the layer of dielectric material of each colour filter are strictly greater than 300 nm.

4. The multispectral filtering matrix according to claim 1, wherein, for each colour filter, the curvatures of the lower surface and of the upper surface of the layer of dielectric material of each colour filter are both convex or both concave.

5. The multispectral filtering matrix according to claim 1, wherein the curved profile of the lower surface of the layer of dielectric material of at least one colour filter of the first and second colour filters is defined by the following equation:

$$y = R_y * \left(1 - \left|\frac{x}{f*Sx}\right|^m\right)^{\frac{1}{n}} + h_{Cri1}$$

and wherein the curved profile of the upper surface of said layer is defined by the following equation:

$$y = R_y * \left(1 - \left|\frac{x}{f*Sx}\right|^m\right)^{\frac{1}{n}} + hi + h_{Cri1}$$

in a (O, X, Y, Z) reference frame in space, with O being the origin of the lower surface of the first reflective layer of the filter $F_i$, With:
- hi the thickness of the layer of dielectric material of said filter,
- $h_{Cri1}$ the thickness, along the axis Y, of the first reflective layer of the filter,
- $R_y$ is the radius of curvature of the lower surface and the upper surface of the layer of dielectric material along the axis Y for x=0,
- m and n respectively a natural number and a non-zero natural number,
- with f*Sx the radius of curvature of the lower surface and of the upper surface along the axis X, Sx being the size, along the axis X, of the photoelectric transducer facing the filter and f is a constant.

6. The multispectral filtering matrix according to claim 1, wherein the curved profile of the lower surface of the layer of dielectric material of at least one colour filter from among the first and second colour filters is defined by the following equation:

$$z = R_z * \left(1 - \left|\frac{x}{f*Sx}\right|^m - \left|\frac{y}{f*Sy}\right|^n\right)^{\frac{1}{k}} + h_{Cri1}$$

and wherein the curved profile of the upper surface of said layer is defined by the following equation:

$$z = R_z * \left(1 - \left|\frac{x}{f*Sx}\right|^m - \left|\frac{y}{f*Sy}\right|^n\right)^{\frac{1}{k}} + hi + h_{Cri1}$$

in a (O, X, Y, Z) reference frame in space, with O being the origin of the lower surface of the first reflective layer of the filter $F_i$,
with:
- hi the thickness of the layer of dielectric material of said filter,
- $h_{Cri1}$ the thickness, along the axis Y, of the first reflective layer of the filter,
- $R_z$ is the radius of curvature of the lower surface and of the upper surface of the layer of dielectric material along the axis Z,
- m and n respectively a natural number and a non-zero natural number, with f*Sx the radius of curvature of the lower surface and the upper surface of the layer of dielectric material along the axis X, SX being the size, along the axis X, of the photoelectric transducer facing the filter and f is a constant,
- with f*$S_y$ the radius of curvature of the lower surface and the upper surface of the layer of dielectric material along the axis Y, $S_y$ being the size, along the axis Y, of the photoelectric transducer facing the filter.

7. The multispectral filtering matrix according to claim 1, wherein, for each colour filter, the curvatures of the lower surface and of the upper surface of the layer of dielectric material are both convex, the curvature of the upper surface and the lower surface of the layer of dielectric material being chosen so as to focus the electromagnetic wave on the transducer facing said filter.

8. A method for manufacturing a multispectral filtering matrix according to claim 1, wherein a thickness of the layer of dielectric material of the first colour filter is less than a thickness of the layer of dielectric material of the second colour filter, and making the first and second colour filters includes:
- depositing a resin layer onto a carrier substrate;
- structuring the resin layer to obtain a first resin pattern defining a first pattern zone and a second resin pattern defining a second pattern zone, each resin pattern having a curved upper surface, the first and second pattern zones defining an overall pattern zone;
- conformally depositing a first reflective layer onto the overall pattern zone, forming the first reflective layer of the first and second colour filters;
- conformally depositing a first layer of dielectric material onto the overall pattern zone, the first layer of dielectric material having a thickness equal to the thickness of the Fabry-Perot cavity layer of dielectric material of the first filter;
- depositing a photosensitive resin layer onto the overall pattern zone;
- removing, by photolithography, the part of the photosensitive resin layer covering the second pattern zone;
- conformally depositing a second layer of dielectric material onto the second pattern zone, a total thickness of the second layer of dielectric material and of the first layer of dielectric material of the second pattern zone being equal to the thickness of the layer of dielectric material of the second colour filter;
- removing the photosensitive resin layer, so as to release the first layer of dielectric material of the first pattern zone forming the Fabry-Perot cavity layer of dielectric material of the first colour filter at the surface, and
- conformally depositing a second reflective layer onto the overall pattern zone, forming the reflective layers of the first and second colour filters.

9. A method for manufacturing a multispectral filtering matrix according to claim 1, wherein the thickness of the layer of dielectric material of the first colour filter is greater than the thickness of the layer of dielectric material of the second colour filter, and making the first and second colour filters includes:
- depositing a resin layer onto a carrier substrate;
- structuring the resin layer to obtain a first resin pattern defining a first pattern zone and a second resin pattern defining a second pattern zone, each resin pattern having a curved upper surface, the first and second pattern zones defining an overall pattern zone;
- conformally depositing a first reflective layer onto the overall pattern zone, forming the first reflective layer of the first and second colour filters;
- conformally depositing a first layer of dielectric material onto the overall pattern zone, the first layer of dielectric material having a thickness equal to the thickness of the Fabry-Perot cavity layer of dielectric material of the first filter;

depositing a photosensitive resin layer onto the overall pattern zone;

removing, by photolithography, the part of the photosensitive resin layer covering the second pattern zone, removing a thickness of the layer of dielectric material of the second pattern zone to obtain the thickness of the layer of dielectric material of the second filter;

removing the photosensitive resin layer, so as to release the first layer of dielectric material of the first pattern zone forming the Fabry-Perot cavity layer of dielectric material of the first colour filter at the surface, and conformally depositing a second reflective layer onto the overall pattern zone forming the first reflective layer of the first and second colour filters.

10. A method for manufacturing a multispectral filtering matrix according to claim 1, wherein the thickness of the layer of dielectric material of the first colour filter is less than the thickness of the layer of dielectric material of the second colour filter, and making the first and second colour filters includes:

depositing a resin layer onto a carrier substrate;

structuring the resin layer, to obtain a first resin pattern defining a first pattern zone and a second resin pattern defining a second pattern zone, each resin pattern having a curved upper surface, the first and second pattern zones defining an overall pattern zone;

conformally depositing a first reflective layer onto the overall pattern zone, forming the first reflective layer of the first and second colour filters;

depositing a layer of dielectric material onto the overall pattern zone, said layer of dielectric material having a planar upper surface;

depositing a second resin layer onto the overall pattern zone;

structuring the second resin layer, to obtain a first and second resin pattern of the second resin layer in the first and second pattern zone, respectively, each resin pattern of the second resin layer having a curved upper surface;

transferring the first and second resin patterns of the second resin layer into the layer of dielectric material to obtain the layer of dielectric material of the first filter in the first pattern zone and the layer of dielectric material of the second filter in the second pattern zone, and conformally depositing a second reflective layer onto the overall pattern zone, forming the first reflective layer of the first and second colour filters.

11. The method for manufacturing a multispectral filtering matrix of claim 8, wherein the structuring of the resin layer is performed by grayscale lithography.

* * * * *